(12) United States Patent
Zhang et al.

(10) Patent No.: US 11,800,262 B2
(45) Date of Patent: Oct. 24, 2023

(54) SERVICE PATH SWITCHING METHOD AND RELATED DEVICE

(71) Applicant: HUAWEI TECHNOLOGIES CO., LTD., Guangdong (CN)

(72) Inventors: Liang Zhang, Nanjing (CN); Jia Che, Beijing (CN); Zhongchao Zhao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 111 days.

(21) Appl. No.: 17/502,288

(22) Filed: Oct. 15, 2021

(65) Prior Publication Data

US 2022/0038798 A1 Feb. 3, 2022

Related U.S. Application Data

(63) Continuation of application No. PCT/CN2020/081799, filed on Mar. 27, 2020.

(30) Foreign Application Priority Data

Apr. 18, 2019 (CN) .................. 201910315382.X

(51) Int. Cl.
*H04B 10/032* (2013.01)
*H04Q 11/00* (2006.01)
*H04B 10/079* (2013.01)

(52) U.S. Cl.
CPC ..... *H04Q 11/0062* (2013.01); *H04B 10/0793* (2013.01); *H04B 10/0795* (2013.01);
(Continued)

(58) Field of Classification Search
CPC .................................................. H04B 10/032
See application file for complete search history.

(56) References Cited

U.S. PATENT DOCUMENTS

| 7,190,896 B1 | 3/2007 | Wang et al. |
| 2004/0107382 A1 | 6/2004 | Doverspike et al. |

(Continued)

FOREIGN PATENT DOCUMENTS

| CN | 101969581 A | 2/2011 |
| CN | 102255744 A | 11/2011 |

(Continued)

OTHER PUBLICATIONS

Office Action issued in CN201910315382.X, dated Nov. 9, 2021, 5 pages.

(Continued)

*Primary Examiner* — Shi K Li

(57) ABSTRACT

According to a method, when it is detected that service traffic needs to be switched from a first optical layer path to a second optical layer path, a first internet protocol (IP) link associated with the service traffic needs to be determined, and an IP link used to transmit the service traffic is adjusted from the first IP link to a second IP link; an optical layer path of the first IP link is switched from the first optical layer path to the second optical layer path after the adjustment of the IP link is completed; and the IP link used to transmit the service traffic is adjusted from the second IP link to the first IP link after the switching of the optical layer path is completed. In this way, continuity of the service traffic can be ensured.

18 Claims, 4 Drawing Sheets

(52) U.S. Cl.
CPC ............ *H04Q 2011/0083* (2013.01); *H04Q 2011/0084* (2013.01); *H04Q 2011/0086* (2013.01)

(56) References Cited

U.S. PATENT DOCUMENTS

| | | | |
|---|---|---|---|
| 2005/0088963 A1* | 4/2005 | Phelps | H04L 43/0882 370/216 |
| 2008/0050117 A1 | 2/2008 | Koley | |
| 2013/0089317 A1 | 4/2013 | Zhang et al. | |
| 2015/0365163 A1* | 12/2015 | Gerstel | H04L 45/62 398/2 |
| 2018/0262422 A1* | 9/2018 | Gerstel | H04L 45/028 |

FOREIGN PATENT DOCUMENTS

| | | |
|---|---|---|
| CN | 102420702 A | 4/2012 |
| CN | 106850424 A | 6/2017 |
| CN | 108141406 B | 4/2020 |
| EP | 1162858 A2 | 12/2001 |

OTHER PUBLICATIONS

International Search Report and Written Opinion issued in PCT/CN2020/081799, dated Jun. 1, 2020, 10 pages.

Chigan Chunxiao et al: "On Joint Restoration of Packet-Over-Optical Networks", ResearchGate, Aug. 1, 2012 (Aug. 1, 2012), pp. 1-12, XP055902268, total 11 pages.

Extended European Search Report issued in EP20791490.4, dated Mar. 30, 2022, 11 pages.

Notice of Allowance issued in CN201910315382.X, dated Mar. 2, 2022, 4 pages.

* cited by examiner

SERVICE PATH SWITCHING METHOD AND RELATED DEVICE

CROSS-REFERENCE TO RELATED APPLICATIONS

This application is a continuation of International Application No. PCT/CN2020/081799, filed on Mar. 27, 2020, which claims priority to Chinese Patent Application No. 201910315382.X, filed on Apr. 18, 2019. The disclosures of the aforementioned applications are hereby incorporated by reference in their entireties.

TECHNICAL FIELD

This application relates to the field of network technologies, and in particular, to a service path switching method and a related device.

BACKGROUND

A conventional internet protocol (IP) layer and optical layer (also referred to as a transport layer) are run and maintained independently, and are unaware of each other. When an optical layer path is switched after a fault at an optical layer is rectified, an IP layer link is interrupted, and protection behavior such as rerouting or hot standby (HSB) at an IP layer is triggered, to ensure link reliability. These actions need to rely on a fault detection method at the IP layer. However, a limitation of a detection technology may cause transient interruption of a service at the IP layer. For a service requiring a high bandwidth and a low delay, this case is not allowed. An existing service path switching solution is lossy switching, which causes second-level interruption of an IP link, and affects an IP service carried on the IP link.

SUMMARY

Embodiments of this application provide a service path switching method and a related device, to ensure that service traffic is not interrupted in a service path switching process.

According to a first aspect, an embodiment of this application provides a service path switching method, including: when it is detected that service traffic needs to be switched from a first optical layer path to a second optical layer path, determining a first internet protocol (IP) link associated with the service traffic, where both the first optical layer path and the second optical layer path are optical layer paths of the first IP link; adjusting, from the first IP link to a second IP link, an IP link used to transmit the service traffic, so that the service traffic is adjusted from the first optical layer path of the first IP link to a third optical layer path of the second IP link; switching an optical layer path of the first IP link from the first optical layer path to the second optical layer path; and adjusting the IP link used to transmit the service traffic from the second IP link to the first IP link when it is detected that the optical layer path of the first IP link is switched from the first optical layer path to the second optical layer path, so that the service traffic is adjusted from the third optical layer path of the second IP link to the second optical layer path of the first IP link. Because direct switching of an optical layer path causes interruption of service traffic, before an optical layer path is switched, first, an affected service path at an IP layer is switched, and after an optical layer path recovers, rerouting of an IP service on a current IP link is triggered, to switch the IP layer service to an initial path. In this detouring manner, the service traffic is not interrupted during service path switching.

In an example embodiment, IP layer link information may be obtained from an IP domain controller and optical layer link information may be obtained from an optical domain controller; and the first IP link associated with the service traffic is determined based on the IP layer link information and the optical layer link information.

In another example embodiment, a working status of the first IP link may be set as a maintenance state, and a first notification message is sent to the IP domain controller, where the first notification message includes the maintenance state, and the first notification message is used to notify the IP domain controller to adjust, from the first IP link to the second IP link, the IP link used to transmit the service traffic. In this way, the IP domain controller is controlled to adjust the IP link.

In another example embodiment, when it is detected that the optical layer path of the first IP link is switched from the first optical layer path to the second optical layer path, a working status of the first IP link is set as a normal state, and a second notification message is sent to the IP domain controller, where the second notification message includes the normal state, and the second notification message is used to notify the IP domain controller to adjust, from the second IP link to the first IP link, the IP link used to transmit the service traffic. In this way, the IP domain controller is controlled to adjust the IP link.

In another example embodiment, when it is detected that the optical layer path of the first IP link is switched from the first optical layer path to the second optical layer path, a priority of the first IP link and a priority of the second IP link are obtained; and when the priority of the first IP link is higher than the priority of the second IP link, the IP link used to transmit the service traffic is adjusted from the second IP link to the first IP link. The service traffic is adjusted to the initial path through service path optimization, to improve the service traffic transmission efficiency.

In another example embodiment, when it is detected that a fault on the second optical layer path is rectified, it is determined that the service traffic needs to be switched from the first optical layer path to the second optical layer path. In this way, it is ensured that switching is performed after a fault on an optical layer path is rectified.

In another example embodiment, IP layer service path adjustment may be displayed, so that a user can preview an IP link adjustment process.

In another example embodiment, the second optical layer path is a path recovered from a faulty state to an available state.

According to a second aspect, an embodiment of this application provides a service path switching apparatus. The service path switching apparatus is configured to implement the method and the function performed by a super controller in the first aspect. The service path switching apparatus is implemented by hardware/software, and the hardware/software includes units corresponding to the foregoing function.

According to a third aspect, an embodiment of this application provides a control device, including a processor, a memory, and a communications bus. The communications bus is configured to implement connection and communication between the processor and the memory, and the processor executes a program stored in the memory, to implement operations in the service path switching method provided in the first aspect.

In an example embodiment, the control device provided in this embodiment of this application may include a corresponding module configured to perform behavior of the service path switching apparatus in the foregoing method embodiments. The module may be software and/or hardware.

In another example embodiment, the processor and the memory may be further integrated. The control device may be a chip.

According to a fourth aspect, an embodiment of this application provides a computer readable storage medium. The computer readable storage medium stores instructions that, when run on a computer, enable the computer to perform the method in the foregoing aspect.

According to a fifth aspect, an embodiment of this application provides a computer program product including instructions that, when run on a computer, enable the computer to perform the method in the foregoing aspect.

BRIEF DESCRIPTION OF DRAWINGS

To describe the technical solutions in the embodiments of this application or in the background more clearly, the following describes the accompanying drawings used in describing the embodiments of this application or the background.

DESCRIPTION OF EMBODIMENTS

The following describes embodiments of this application with reference to the accompanying drawings in the embodiments of this application.

Figure 1:
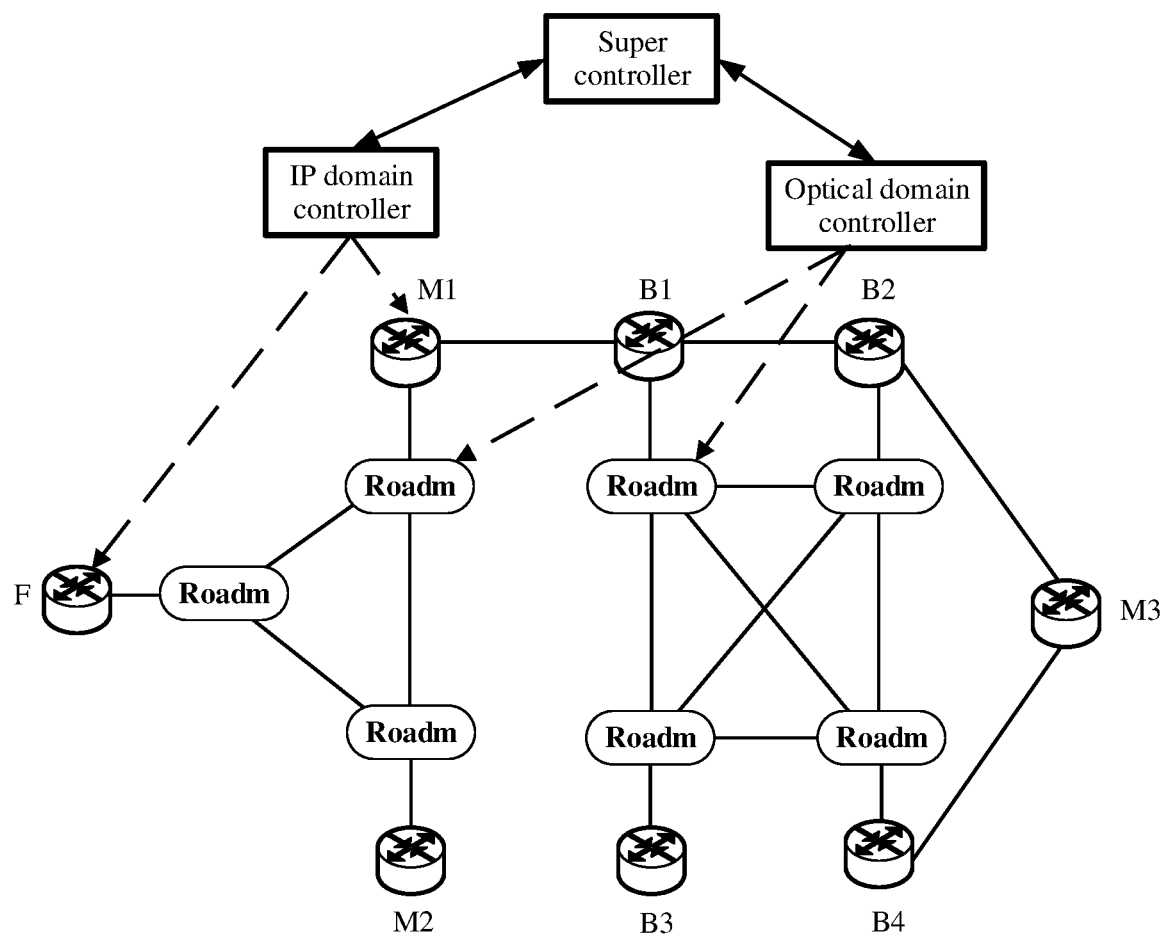
FIG. 1 is a schematic structural diagram of a network system according to an embodiment of this application.

FIG. 1 is a schematic structural diagram of a network system according to an embodiment of this application. The network system includes a super controller, an IP domain controller, and an optical domain controller. The three controllers may be three independent hardware devices or systems, or may be three function modules running on one hardware device or system. The hardware device or system corresponding to each controller includes at least one processor and a memory that stores computer readable instructions used to perform an operation of the controller. The network system may further include a plurality of network devices, and the network devices include an IP network device and an optical transport network device. The IP network device includes a router M1, a router M2, a router M3, a router F, a router B1, a router B2, a router B3, and a router B4, and the optical transport network device includes a plurality of reconfigurable optical add-drop multiplexers (ROADM). In this networking scenario, the super controller is mainly configured to coordinate with the IP domain controller and the optical domain controller to perform flat management on cross-layer networks together and resolve a problem related to cross-layer coordination. The IP domain controller is configured to perform service management of a single-layer IP network device. For example, the router M1, the router M2, the router M3, the router F, the router B1, the router B2, the router B3, and the router B4 in FIG. 1 may be managed. The optical domain controller is mainly configured to perform service management of a single-layer optical transport network device. For example, the plurality of Roadms in FIG. 1 may be managed. The Roadm is an optical layer node, and an optical layer path may be switched by changing an optical layer node. The network system is an SDN controller system based on a software-defined networking (SDN) architecture, and is mainly used to resolve a related problem of performing service path switching on a cross-layer network after a fault is rectified.

Figure 2:
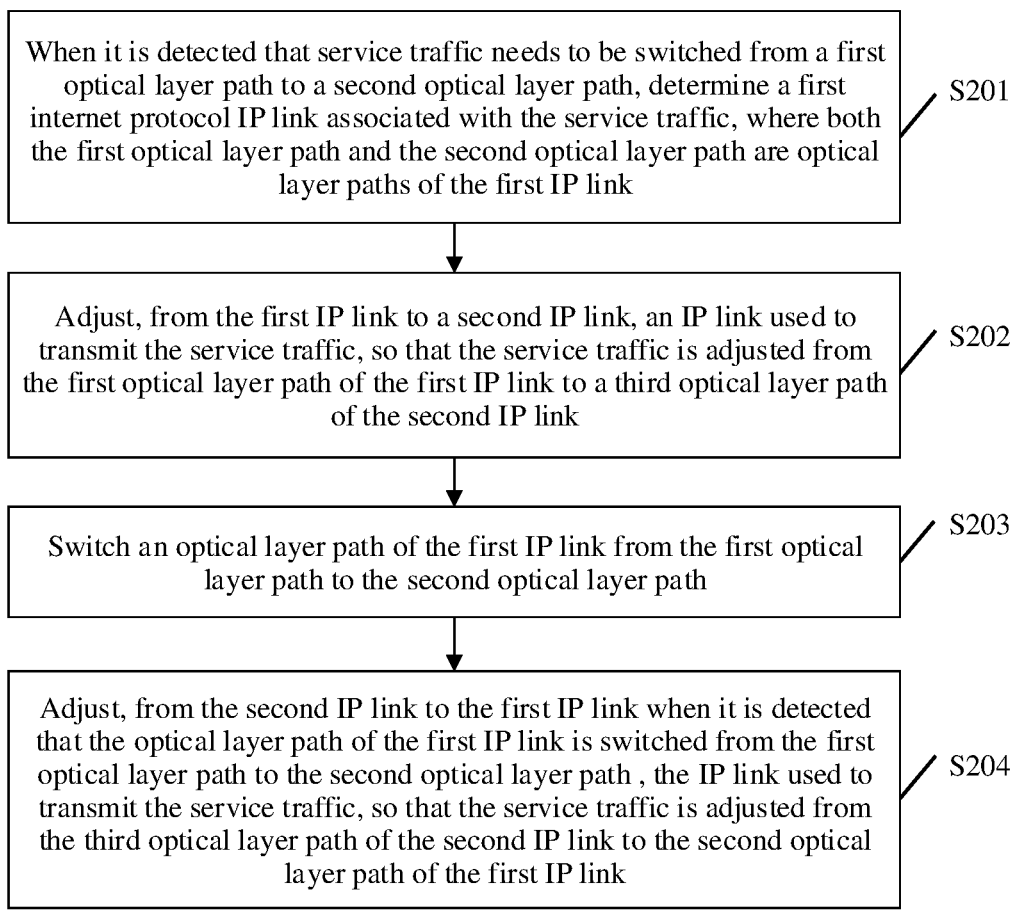
FIG. 2 is a schematic flowchart of a service path switching method according to an embodiment of this application.

A technical solution provides a solution for switching a service path through manual coordination operation. The solution includes: (1) Check, on an optical domain controller, a client service associated with an optical layer path that can be switched. (2) Check an IP link associated with the current client service. (3) Check, on an IP domain controller, a tunnel service associated with the IP link. (4) Set a status of the associated IP link as a maintenance state on the IP domain controller. (5) Check, on the IP domain controller, whether a tunnel service path associated with the IP link has avoided the link in the maintenance state. (6) Switch a path of the client service on the optical domain controller when the link in the maintenance state has been avoided. However, this manual coordination operation manner has the following problems: First, the operation is complex and error-prone. Second, the manual operation is time-consuming, and cannot implement quick switching. Third, there is no cross-layer visualization, and an association relationship between cross-layer services cannot be checked intuitively. Another technical solution provides an automatic optical layer switching solution. An attribute of a client service may be set to automatic switching on an optical domain controller, to implement automatic optical layer switching. However, the automatic optical layer switching is lossy switching, which causes second-level interruption of an IP link, and affects an IP service carried on the IP link. To resolve the foregoing technical problems, this application provides the following technical solutions:

FIG. 2 is a schematic flowchart of a service path switching method according to an embodiment of this application. As shown in the figure, operations in this embodiment of this application include at least the following content.

S201: When it is detected that service traffic needs to be switched from a first optical layer path to a second optical layer path, determine a first internet protocol (IP) link associated with the service traffic, where both the first optical layer path and the second optical layer path are optical layer paths of the first IP link, and the second optical layer path is a path recovered from a faulty state to an available state.

During specific implementation, both the first optical layer path and the second optical layer path are optical layer paths of a same IP link. When a fault occurs on the second optical layer path, the first optical layer path is enabled, and the service traffic is switched from the second optical layer path to the first optical layer path. The first optical layer path is a standby path of the IP link. When the fault on the second optical layer path is rectified, an optical domain controller may send a notification message to a super controller, where the notification message is used to indicate, to the super controller, that the fault on the second optical layer path is rectified. After receiving the notification message, the super controller may determine that the service traffic needs to be switched from the first optical layer path to the second optical layer path. In this case, the super controller may obtain IP layer link information from an IP domain controller and obtain optical layer link information from the optical domain controller; and then determine, based on the IP layer link information and the optical layer link information, the first IP link associated with the service traffic.

It should be understood that an optical layer path of an IP link corresponds to a service path of a client service, the client service is an electrical layer service, and the electrical layer service is a service from one tributary board to another tributary board on an optical transport network (OTN). A transport network element performs optical-to-electrical conversion on the electrical layer service, and sends a converted signal to an optical channel (OCH). A specific iteration process is as follows: Service traffic is first sent to an IP link, then to a client from the IP link, and finally to an optical layer path of the IP link.

Figure 3:
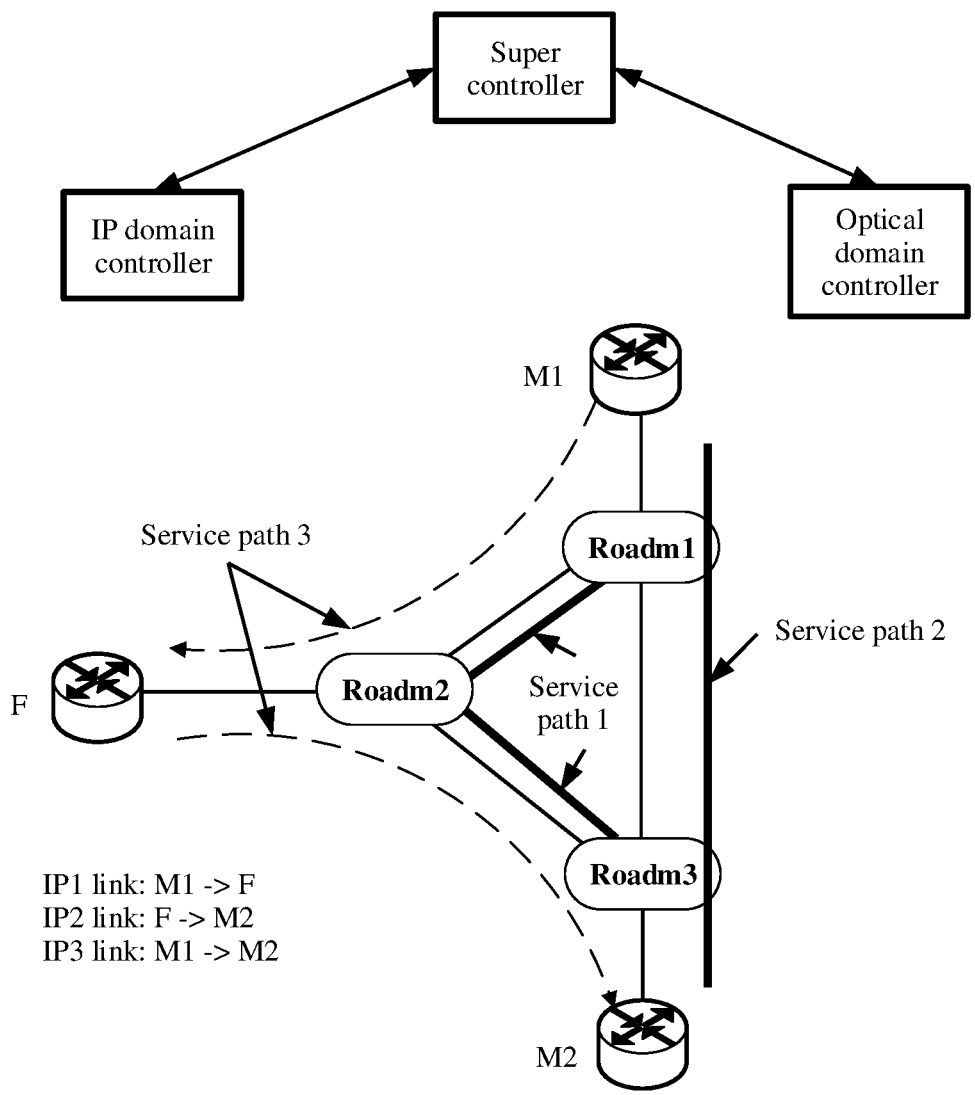
FIG. 3 is a schematic diagram of service path switching according to an embodiment of this application.

For example, as shown in FIG. 3, the first IP link is an IP3 link, the second IP link includes an IP1 link and an IP2 link, the first optical layer path corresponds to a service path 1, the second optical layer path corresponds to a service path 2, and a third optical layer path corresponds to a service path 3. The IP1 link is from a router M1 to a router F, the IP2 link is from the router F to a router M2, and the IP3 link is from the M1 router to the M2 router. The service path 3 is an optical layer path of the IP1 link and the IP2 link. When the service traffic is transmitted by using the service path 3, the service traffic first reaches the router F through the optical layer path of the IP1 link, and then reaches the router M2 through the optical layer path of the IP2 link. The service path 1 is an optical layer path of the IP3 link, and the service traffic does not need to pass through the router F when being transmitted by using the service path 1. Nodes on an optical layer path include a Roadm1, a Roadm2, and a Roadm3. Before a fault occurs on the optical layer path, an optical layer path of the IP3 link is the service path 2 (Roadm1–>Roadm3). Because an optical fiber between the Roadm1 and the Roadm3 is faulty and needs to be maintained, the optical layer path of the IP3 link is switched from the service path 2 to the service path 1 (Roadm1–>Roadm2–>Roadm3). After the fault on the optical fiber between the Roadm1 and the Roadm3 is rectified, the optical layer path of the IP3 link needs to be switched from the service path 1 to the service path 2. However, direct switching of an optical layer path causes an interruption of service traffic. Therefore, an IP layer path is switched for transmitting the service traffic. After the IP link is adjusted, the service traffic is sent first to a path of the IP layer link, then to a client from the IP link, and finally to an optical layer path of the IP layer link.

S202: Adjust, from the first IP link (e.g., the IP3 link) to a second IP link (e.g., including both the IP1 link and the IP2 link), an IP link used to transmit the service traffic, so that the service traffic is adjusted from the first optical layer path of the first IP link to the third optical layer path of the second IP link.

During specific implementation, the super controller may set a working status of the first IP link as a maintenance state, and then send a first notification message to the IP domain controller, where the first notification message includes the maintenance state, and the first notification message is used to notify the IP domain controller to adjust the first IP link to the second IP link. After receiving the first notification message, the IP domain controller adjusts, from the first IP link to the second IP link by invoking an IP link maintenance interface of the IP domain controller, the IP link used to transmit the service traffic. The IP link is switched for transmitting the service traffic, so that the service traffic is adjusted from the first optical layer path of the first IP link to the third optical layer path of the second IP link.

As shown in FIG. 3, the first optical layer path corresponds to the service path 1, the second optical layer path corresponds to the service path 2, and the third optical layer path corresponds to the service path 3. The first IP link is from the M1 router to the M2 router (the IP3 link), and the second IP link includes the link (the IP1 link) from the router M1 to the router F and the link (the IP2 link) from the router F to the router M2. On a network shown in FIG. 3, S202 may be: Adjust, at an IP layer, the service traffic from the IP3 link to the IP link including the IP1 link and the IP2 link. Correspondingly, at an optical layer, the service traffic is adjusted from the service path 1 corresponding to the IP3 link to the service path 3 corresponding to the IP1 link+IP2 link. After the IP link is adjusted, the service traffic is transmitted on the service path 3 (a dashed part) of the combined link (the IP1 link and the IP2 link). When the service traffic is transmitted by using the service path 3, the service traffic first reaches the router F through the optical layer path of the IP1 link, and then reaches the router M2 through the optical layer path of the IP2 link. Then, the optical layer path of the IP3 link can be switched. In this case, the service traffic is not interrupted.

Optionally, IP layer service path adjustment may be displayed, so that a user can preview an IP link adjustment process.

S203: Switch an optical layer path of the first IP link from the first optical layer path to the second optical layer path.

During specific implementation, after the service traffic is adjusted from the first optical layer path of the first IP link (e.g., the IP3 link) to the third optical layer path of the second IP link (e.g., including both the IP1 link and the IP2 link), the super controller may switch, by invoking a switching interface of the optical domain controller, the optical layer path of the first IP link from the first optical layer path to the second optical layer path.

For example, as shown in FIG. 3, before a fault occurs on the optical layer path of the IP3 link, the service traffic passes through the service path 2 (Roadm1–>Roadm3, the second optical layer path) of the IP3 link (the first IP link). When a fault occurs on the service path 2 of the IP3 link, the optical layer path of the IP3 link is switched from the service path 2 (Roadm1–>Roadm3, the second optical layer path) to the service path 1 (Roadm1–>Roadm2–>Roadm3, the first optical layer path). After the fault on the service path 2 (the second optical layer path) is rectified, the optical layer path of the IP3 link is switched from the service path 1 (Roadm1–>Roadm2–>Roadm3, the first optical layer path) to the service path 2 (Roadm1–>Roadm3, the second optical layer path).

S204: Adjust, from the second IP link (e.g., the IP1 link and the IP2 link) to the first IP link (e.g., the IP3 link) when it is detected that the optical layer path of the first IP link is switched from the first optical layer path to the second optical layer path, the IP link used to transmit the service traffic, so that the service traffic is adjusted from the third optical layer path of the second IP link to the second optical layer path of the first IP link.

During specific implementation, when it is detected that the optical layer path of the first IP link is switched from the first optical layer path to the second optical layer path, the super controller may set the working status of the first IP link as a normal state. Then, the super controller sends a second notification message to the IP domain controller, where the second notification message is used to notify the IP domain controller to adjust, from the second IP link to the first IP link, the IP link used to transmit the service traffic. Specifically, the second notification message may include information used to identify that the first IP link is in the normal state, so that the IP domain controller determines that the first IP link can work. After receiving the second notification message, the IP domain controller adjusts the service traffic from the third optical layer path of the second IP link to the second optical layer path of the first IP link by invoking the IP link maintenance interface of the IP domain controller.

Optionally, when it is detected that the optical layer path of the first IP link is switched from the first optical layer path to the second optical layer path, the super controller may obtain a priority of the first IP link and a priority of the second IP link. Because the priority of the first IP link is higher than the priority of the second IP link, the IP link used to transmit the service traffic is adjusted from the second IP link to the first IP link. The IP layer link is adjusted to the first IP link through service path optimization, where the second optical layer path of the first IP link is an initial path, and the initial path is a path through which the service traffic passes before the fault occurs on the service path.

For example, as shown in FIG. 3, after the optical layer path of the IP3 link is switched from the service path 1 (Roadm1->Roadm2->Roadm3, the first optical layer path) to the service path 2 (Roadm1->Roadm3, the second optical layer path), the IP link may be adjusted from the combined link (the IP1 link and the IP2 link) to the IP3 link. In this way, the service traffic is adjusted from the service path 3 of the combined link to the service path 2 of the IP3 link.

In this embodiment of this application, because direct switching of an optical layer path causes interruption of service traffic, and switching a path at the IP layer does not cause interruption of service traffic, before an optical layer path is switched, first, an affected service path at the IP layer is switched, and after the optical layer path recovers, rerouting of an IP service on a current IP link is triggered, to switch an IP layer service to an initial path. In this detouring manner, it is ensured that service traffic is not interrupted during service path switching.

Figure 4:
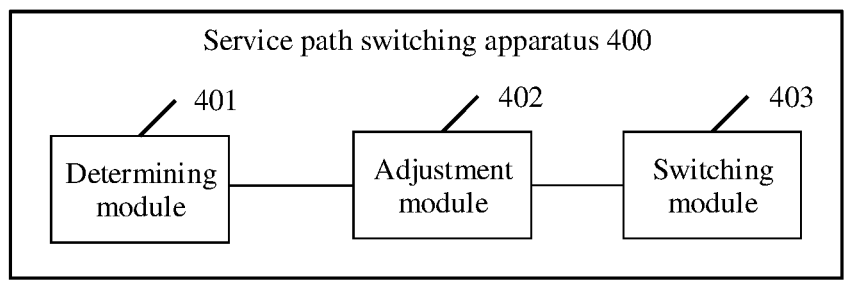
FIG. 4 is a schematic structural diagram of a service path switching apparatus according to an embodiment of this application.

FIG. 4 is a schematic structural diagram of a service path switching apparatus 400 according to an embodiment of this application. As shown in FIG. 4, the apparatus 400 in this embodiment of this application includes at least:

a determining module 401, configured to: when it is detected that service traffic needs to be switched from a first optical layer path to a second optical layer path, determine a first internet protocol (IP) link associated with the service traffic, where both the first optical layer path and the second optical layer path are optical layer paths of the first IP link;

an adjustment module 402, configured to adjust, from the first IP link to a second IP link, an IP link used to transmit the service traffic, so that the service traffic is adjusted from the first optical layer path of the first IP link to a third optical layer path of the second IP link; and a switching module 403, configured to switch an optical layer path of the first IP link from the first optical layer path to the second optical layer path, where the adjustment module 402 is further configured to adjust, from the second IP link to the first IP link when it is detected that the optical layer path of the first IP link is switched from the first optical layer path to the second optical layer path, the IP link used to transmit the service traffic, so that the service traffic is adjusted from the third optical layer path of the second IP link to the second optical layer path of the first IP link.

Optionally, the determining module 401 is further configured to: obtain IP layer link information from an IP domain controller and obtain optical layer link information from an optical domain controller; and determine, based on the IP layer link information and the optical layer link information, the first IP link associated with the service traffic.

Optionally, the adjustment module 402 is further configured to: set a working status of the first IP link as a maintenance state; and send a first notification message to the IP domain controller, where the first notification message includes the maintenance state, and the first notification message is used to notify the IP domain controller to adjust, from the first IP link to the second IP link, the IP link used to transmit the service traffic.

Optionally, the adjustment module 402 is further configured to: when it is detected that the optical layer path of the first IP link is switched from the first optical layer path to the second optical layer path, set a working status of the first IP link as a normal state; and send a second notification message to the IP domain controller, where the second notification message includes the normal state, and the second notification message is used to notify the IP domain controller to adjust, from the second IP link to the first IP link, the IP link used to transmit the service traffic.

Optionally, the adjustment module 402 is further configured to: when it is detected that the optical layer path of the first IP link is switched from the first optical layer path to the second optical layer path, obtain a priority of the first IP link and a priority of the second IP link; and when the priority of the first IP link is higher than the priority of the second IP link, adjust, from the second IP link to the first IP link, the IP link used to transmit the service traffic.

Optionally, the determining module 401 is further configured to: when it is detected that a fault on the second optical layer path is rectified, determine that the service traffic needs to be switched from the first optical layer path to the second optical layer path.

The second optical layer path is a path recovered from a faulty state to an available state.

It should be noted that for implementation of each module, refer to the corresponding descriptions of the method embodiment shown in FIG. 2, to perform the method and the function performed by the super controller in the foregoing embodiment.

Figure 5:
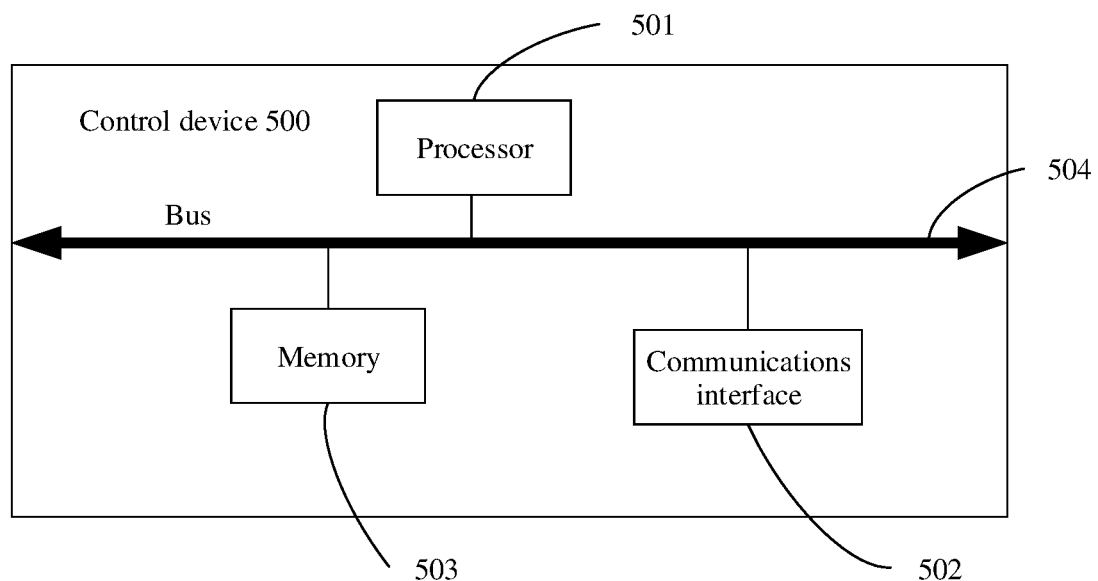
FIG. 5 is a schematic structural diagram of a control device according to an embodiment of this application.

FIG. 5 is a schematic structural diagram of a control device 500 according to an embodiment of this application. As shown in FIG. 5, the control device 500 may include at least one processor 501, at least one communications interface 502, at least one memory 503, and at least one communications bus 504. Certainly, in some implementations, the processor and the memory may be further integrated. The control device may be a chip. When the super controller, the IP domain controller, and the optical domain controller in FIG. 3 are three independent hardware devices, the control device 500 may be the super controller in FIG. 3. When the super controller, the IP domain controller, and the optical domain controller in FIG. 3 are three function modules running on one device or system, the control device 500 may be the device or system.

The processor 501 may include one or more microprocessors, a digital signal processor, a microprocessor, or the like. The communications bus 504 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 5, but this does not mean that there is only one bus or only one type of bus. The communications bus 504 is configured to implement connection and communication between the components. The communications interface 502 of the device in this embodiment of this application is configured to perform signaling or data communication with another node device, for example, an RJ45 interface. The memory 503 may include a volatile memory such as a nonvolatile dynamic random access memory (NVRAM), a phase change random access memory (PRAM), or a magnetoresistive random access memory (Magnetoresistive RAM, MRAM), and may further include a nonvolatile memory such as at least one magnetic disk storage device, an electronically erasable programmable read-only memory (EEPROM), a flash memory such as a NOR flash memory or a NAND flash memory, a semiconductor device such as a solid state drive (SSD), or the like. Optionally, the memory 503 may be at least one storage apparatus located far away from the processor 501. Optionally, the memory 503 may further store a group of program code, and optionally, the processor 501 may further execute the program in the memory 503, to enable the control device 500 to perform the following operations:

when it is detected that service traffic needs to be switched from a first optical layer path to a second optical layer path, determining a first internet protocol (IP) link associated with the service traffic, where both the first optical layer path and the second optical layer path are optical layer paths of the first IP link;

adjusting, from the first IP link to a second IP link, an IP link used to transmit the service traffic, so that the service traffic is adjusted from the first optical layer path of the first IP link to a third optical layer path of the second IP link;

switching the optical layer path of the first IP link from the first optical layer path to the second optical layer path; and adjusting, from the second IP link to the first IP link when it is detected that the optical layer path of the first IP link is switched from the first optical layer path to the second optical layer path, the IP link used to transmit the service traffic, so that the service traffic is adjusted from the third optical layer path of the second IP link to the second optical layer path of the first IP link.

Optionally, the processor 501 is further configured to perform the following operations:

obtaining IP layer link information from an IP domain controller and obtaining optical layer link information from an optical domain controller; and determining, based on the IP layer link information and the optical layer link information, the first IP link associated with the service traffic.

Optionally, the processor 501 is further configured to perform the following operations:

setting a working status of the first IP link as a maintenance state; and sending a first notification message to the IP domain controller, where the first notification message includes the maintenance state, and the first notification message is used to notify the IP domain controller to adjust, from the first IP link to the second IP link, the IP link used to transmit the service traffic.

Optionally, the processor 501 is further configured to perform the following operations:

when it is detected that the optical layer path of the first IP link is switched from the first optical layer path to the second optical layer path, setting a working status of the first IP link as a normal state; and sending a second notification message to the IP domain controller, where the second notification message includes the normal state, and the second notification message is used to notify the IP domain controller to adjust, from the second IP link to the first IP link, the IP link used to transmit the service traffic.

Optionally, the processor 501 is further configured to perform the following operations:

when it is detected that the optical layer path of the first IP link is switched from the first optical layer path to the second optical layer path, obtaining a priority of the first IP link and a priority of the second IP link; and when the priority of the first IP link is higher than the priority of the second IP link, adjusting, from the second IP link to the first IP link, the IP link used to transmit the service traffic.

Optionally, the processor 501 is further configured to perform the following operations:

when it is detected that a fault on the second optical layer path is rectified, determining that the service traffic needs to be switched from the first optical layer path to the second optical layer path.

The second optical layer path is a path recovered from a faulty state to an available state.

Further, the processor may further cooperate with the memory and the communications interface, to enable the control device 500 to perform operations of the super controller in the foregoing embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The objective, the technical solutions, and the beneficial effects of this application are further described in detail in the foregoing specific implementations. Any modification, equivalent replacement, or improvement made without departing from the principle of this application shall fall within the protection scope of this application.

What is claimed is:

1. A method, comprising:
determining a first internet protocol (IP) link associated with service traffic when it is detected that the service traffic needs to be switched from a first optical layer path to a second optical layer path, wherein both the first optical layer path and the second optical layer path are optical layer paths of the first IP link;

adjusting an IP link used to transmit the service traffic from the first IP link to a second IP link, so that the service traffic is adjusted from the first optical layer path of the first IP link to a third optical layer path of the second IP link;

switching an optical layer path of the first IP link from the first optical layer path to the second optical layer path; and adjusting the IP link used to transmit the service traffic from the second IP link to the first IP link when it is detected that the optical layer path of the first IP link is switched from the first optical layer path to the second optical layer path, so that the service traffic is adjusted from the third optical layer path of the second IP link to the second optical layer path of the first IP link, wherein the adjusting the IP link used to transmit the service traffic from the second IP link to the first IP link when it is detected that the optical layer path of the first IP link is switched from the first optical layer path to the second optical layer path comprises:

obtaining a priority of the first IP link and a priority of the second IP link when it is detected that the optical layer path of the first IP link is switched from the first optical layer path to the second optical layer path; and adjusting the IP link used to transmit the service traffic from the second IP link to the first IP link when the priority of the first IP link is higher than the priority of the second IP link.

2. The method according to claim 1, wherein the determining a first internet protocol (IP) link associated with service traffic comprises:

obtaining IP layer link information from an IP domain controller and obtaining optical layer link information from an optical domain controller; and determining, based on the IP layer link information and the optical layer link information, the first IP link associated with the service traffic.

3. The method according to claim 2, wherein the adjusting an IP link used to transmit the service traffic from the first IP link to a second IP link comprises:

setting a working status of the first IP link as a maintenance state; and sending a first notification message to the IP domain controller, wherein the first notification message comprises the maintenance state, and the first notification message notifies the IP domain controller to adjust, from the first IP link to the second IP link, the IP link used to transmit the service traffic.

4. The method according to claim 2, wherein the adjusting the IP link used to transmit the service traffic from the second IP link to the first IP link when it is detected that the optical layer path of the first IP link is switched from the first optical layer path to the second optical layer path comprises:

setting a working status of the first IP link as a normal state when it is detected that the optical layer path of the first IP link is switched from the first optical layer path to the second optical layer path; and sending a second notification message to the IP domain controller, wherein the second notification message comprises the normal state, and the second notification message notifies the IP domain controller to adjust, from the second IP link to the first IP link, the IP link used to transmit the service traffic.

5. The method according to claim 1, wherein the method further comprises, before the determining a first internet protocol (IP) link associated with the service traffic:

determining that the service traffic needs to be switched from the first optical layer path to the second optical layer path when it is detected that a fault on the second optical layer path is rectified.

6. The method according to claim 1, wherein the second optical layer path is a path recovered from a faulty state to an available state.

7. A service path switching apparatus, comprising:

at least one processor;

one or more memories coupled to the at least one processor and storing instructions; that, when executed by the at least one processor, cause the apparatus to:

determine a first internet protocol (IP) link associated with service traffic when it is detected that the service traffic needs to be switched from a first optical layer path to a second optical layer path, wherein both the first optical layer path and the second optical layer path are optical layer paths of the first IP link;

adjust an IP link used to transmit the service traffic from the first IP link to a second IP link, so that the service traffic is adjusted from the first optical layer path of the first IP link to a third optical layer path of the second IP link;

switch an optical layer path of the first IP link from the first optical layer path to the second optical layer path; and adjust the IP link used to transmit the service traffic from the second IP link to the first IP link when it is detected that the optical layer path of the first IP link is switched from the first optical layer path to the second optical layer path, so that the service traffic is adjusted from the third optical layer path of the second IP link to the second optical layer path of the first IP link, wherein the adjusting of the IP link used to transmit the service traffic from the second IP link to the first IP link when it is detected that the optical layer path of the first IP link is switched from the first optical layer path to the second optical layer path comprises:

obtaining a priority of the first IP link and a priority of the second IP link when it is detected that the optical layer path of the first IP link is switched from the first optical layer path to the second optical layer path; and adjusting the IP link used to transmit the service traffic from the second IP link to the first IP link when the priority of the first IP link is higher than the priority of the second IP link.

8. The apparatus according to claim 7, wherein the instructions, when executed by the at least one processor, further cause the apparatus to:

obtain IP layer link information from an IP domain controller and obtain optical layer link information from an optical domain controller; and determine, based on the IP layer link information and the optical layer link information, the first IP link associated with the service traffic.

9. The apparatus according to claim 8, wherein the instructions, when executed by the at least one processor, further cause the apparatus to:

set a working status of the first IP link as a maintenance state; and send a first notification message to the IP domain controller, wherein the first notification message comprises the maintenance state, and the first notification message notifies the IP domain controller to adjust, from the first IP link to the second IP link, the IP link used to transmit the service traffic.

10. The apparatus according to claim 8, wherein the instructions, when executed by the at least one processor, further cause the apparatus to:
set a working status of the first IP link as a normal state when it is detected that the optical layer path of the first IP link is switched from the first optical layer path to the second optical layer path; and send a second notification message to the IP domain controller, wherein the second notification message comprises the normal state, and the second notification message notifies the IP domain controller to adjust, from the second IP link to the first IP link, the IP link used to transmit the service traffic.

11. The apparatus according to claim 7, wherein the instructions, when executed by the at least one processor, further cause the apparatus to:
determine that the service traffic needs to be switched from the first optical layer path to the second optical layer path when it is detected that a fault on the second optical layer path is rectified.

12. The apparatus according to claim 7, wherein the second optical layer path is a path recovered from a faulty state to an available state.

13. A non-transitory storage medium storing a program that, when executed by one or more processors, causes an apparatus to perform operations comprising:
determining a first internet protocol (IP) link associated with service traffic when it is detected that the service traffic needs to be switched from a first optical layer path to a second optical layer path, wherein both the first optical layer path and the second optical layer path are optical layer paths of the first IP link;
adjusting an IP link used to transmit the service traffic from the first IP link to a second IP link, so that the service traffic is adjusted from the first optical layer path of the first IP link to a third optical layer path of the second IP link;
switching an optical layer path of the first IP link from the first optical layer path to the second optical layer path; and
adjusting the IP link used to transmit the service traffic from the second IP link to the first IP link when it is detected that the optical layer path of the first IP link is switched from the first optical layer path to the second optical layer path, so that the service traffic is adjusted from the third optical layer path of the second IP link to the second optical layer path of the first IP link,
wherein the adjusting the IP link used to transmit the service traffic from the second IP link to the first IP link when it is detected that the optical layer path of the first IP link is switched from the first optical layer path to the second optical layer path comprises:
obtaining a priority of the first IP link and a priority of the second IP link when it is detected that the optical layer path of the first IP link is switched from the first optical layer path to the second optical layer path; and
adjusting the IP link used to transmit the service traffic from the second IP link to the first IP link when the priority of the first IP link is higher than the priority of the second IP link.

14. The non-transitory storage medium according to claim 13, wherein the operations further comprise:
obtaining IP layer link information from an IP domain controller and obtaining optical layer link information from an optical domain controller; and
determining, based on the IP layer link information and the optical layer link information, the first IP link associated with the service traffic.

15. The non-transitory storage medium according to claim 14, wherein the operations further comprise:
setting a working status of the first IP link as a maintenance state; and
sending a first notification message to the IP domain controller, wherein the first notification message comprises the maintenance state, and the first notification message notifies the IP domain controller to adjust, from the first IP link to the second IP link, the IP link used to transmit the service traffic.

16. A computer program product comprising computer-executable instructions that, when executed by at least one processor, cause an apparatus to:
determine a first internet protocol (IP) link associated with service traffic when it is detected that service traffic needs to be switched from a first optical layer path to a second optical layer path, wherein both the first optical layer path and the second optical layer path are optical layer paths of the first IP link;
adjust an IP link used to transmit the service traffic from the first IP link to a second IP link, so that the service traffic is adjusted from the first optical layer path of the first IP link to a third optical layer path of the second IP link;
switch an optical layer path of the first IP link from the first optical layer path to the second optical layer path; and
adjust the IP link used to transmit the service traffic from the second IP link to the first IP link when it is detected that the optical layer path of the first IP link is switched from the first optical layer path to the second optical layer path, so that the service traffic is adjusted from the third optical layer path of the second IP link to the second optical layer path of the first IP link;
wherein the adjusting of the IP link used to transmit the service traffic from the second IP link to the first IP link when it is detected that the optical layer path of the first IP link is switched from the first optical layer path to the second optical layer path comprises:
obtaining a priority of the first IP link and a priority of the second IP link when it is detected that the optical layer path of the first IP link is switched from the first optical layer path to the second optical layer path, and
adjusting the IP link used to transmit the service traffic from the second IP link to the first IP link when the priority of the first IP link is higher than the priority of the second IP link.

17. The computer program product according to claim 16, wherein the instructions, when executed by the at least one processor, further cause the apparatus to:
obtain IP layer link information from an IP domain controller and obtaining optical layer link information from an optical domain controller; and
determine, based on the IP layer link information and the optical layer link information, the first IP link associated with the service traffic.

18. The computer program product according to claim 17, wherein the instructions, when executed by the at least one processor, further cause the apparatus to:
set a working status of the first IP link as a maintenance state; and send a first notification message to the IP domain controller, wherein the first notification message comprises the maintenance state, and the first notification message notifies the IP domain controller to adjust, from the first IP link to the second IP link, the IP link used to transmit the service traffic.

* * * * *